(12) United States Patent
Kim et al.

(10) Patent No.: US 6,231,958 B1
(45) Date of Patent: May 15, 2001

(54) HEAT-SHRINKABLE POLYESTER FILM AND METHOD FOR MANUFACTURING THE SAME

(75) Inventors: Nam-il Kim; Sang-il Kim, both of Suwon (KR)

(73) Assignee: SKC Co., Ltd., Kyungki-do (KR)

( * ) Notice: Subject to any disclaimer, the term of this patent is extended or adjusted under 35 U.S.C. 154(b) by 0 days.

(21) Appl. No.: 09/626,152

(22) Filed: Jul. 26, 2000

(30) Foreign Application Priority Data

Jul. 27, 1999 (KR) .................................................. 99 30554
Oct. 8, 1999 (KR) .................................................. 99 43842

(51) Int. Cl.$^7$ ................................. B32B 5/16; C08F 20/00
(52) U.S. Cl. ......................... 428/272; 528/272; 528/308; 528/308.6; 525/444; 428/141; 428/147; 428/323; 428/338; 428/913; 430/56; 430/135; 430/285; 430/501; 430/908
(58) Field of Search ..................................... 528/272, 308, 528/308.6; 525/444; 428/141, 147, 323, 338, 339, 913; 430/56, 135, 285, 501, 908

(56) References Cited

U.S. PATENT DOCUMENTS

| | | | |
|---|---|---|---|
| 4,996,291 | * | 2/1991 | Yoshinaka et al. .................. 528/272 |
| 5,047,383 | * | 9/1991 | Hayashi et al. ....................... 503/200 |
| 5,089,341 | * | 2/1992 | Yoshimura et al. .................. 428/412 |
| 5,458,949 | * | 10/1995 | Komiyama et al. .................. 428/141 |
| 5,503,953 | * | 4/1996 | Ito et al. ................................ 430/49 |

* cited by examiner

*Primary Examiner*—Samuel A. Acquah
(74) *Attorney, Agent, or Firm*—Nixon & Vanderhye PC; Frank P. Presta

(57) ABSTRACT

A heat-shrinkable polyester film including: a repeating unit of trimethyleneterephtalate of 5–30% by mole; a repeating unit of 2,2-dimethyl(-1,3-propylene)terephtalate of 5–30% by mole of the total composition; and a repeating unit of ethyleneterephtalate for the balance. The heat-shrinkable polyester film has excellent printability, mechanical properties, film-and-flux adhesiveness and shrinkage properties, and ease of drawing process. Thus, the heat-shrinkable polyester film can be used as labels or coverings for a variety of containers.

9 Claims, 1 Drawing Sheet

HEAT-SHRINKABLE POLYESTER FILM AND METHOD FOR MANUFACTURING THE SAME

BACKGROUND OF THE INVENTION

1. Field of the Invention

The present invention relates to a heat-shrinkable polyester film, and more particularly, to a heat-shrinkable polyester film used for labels or coverings of containers and a method for manufacturing the same, the heat-shrinkable polyester film having superior transparency, superior printing and mechanical properties, superior film-to-flux adhesiveness, optimum shrinking properties and easy of drawing process. 2. Description of the Related Art Heat-shrinkable films have been extensively used for various purposes, for example, for labeling plastic or glass bottles, batteries, or electrolytic condensers, for covering containers, and for fastening or batch-packing stationary or a plurality of containers. Such heat-shrinkable films are mainly formed of polyvinyl chloride, polystyrene and the like. Recently, use of polyester films as such a heat-shrinkable film is increasing.

Requirements for heat-shrinkable films to be used as wrapping or labeling materials, include a good sealing property and an excellent shrinking property, as well as basic film properties such as heat resistance, chemical resistance, weather resistance and good printability.

Conventional heat-shrinkable films formed of polyvinyl chloride or polystyrene are unsatisfactory in terms of heat resistance, chemical resistance, weather resistance and heat-shrinking properties. In particular, polyvinyl chloride based heat-shrinkable films, which contain chlorine components, have been considered to be unfavorable in terms of an environmental aspect because they produce pollutants during incineration. On the other hand, polyethylene films show inferior printability and thus a special purpose ink, rather than common inks, is needed for application to such films. In addition, its high spontaneous shrinkage ratio make it difficult to be stored for a period of time, and causes failure in a printing process.

Meanwhile, more common heat-shrinkable polyester films formed of polyethylene terephtalate (PET) have a satisfactory heat resistance, chemical resistance, weather stability and shrinking property. However, because shrinkage stress and shrinkage ratio are so high, directly labeling or completely covering a container with a heat-shrinkable polyester film causes various problems. In other words, if the shrinkage ratio of the heat-shrinkable polyester film is too high, nonuniform shrinking results due to the deviation of temperature within a shrinkage tunnel or at the surface of the container. As a result, an image printed on the film is distorted, thereby lowering the commercial usefulness of the product.

Recently, for the purpose of saving storage space, use of rectangular containers is increasing. As shown in FIG. 1, when a conventional polyester heat-shrinkable film is used as a label 11 for such a rectangular container 10, shrinkage stress and shrinkage ratio are high in a direction perpendicular to the major shrinkage direction. Due to a difference in the shrinkage ratio at the edges of the rectangular container 10 and at the flat sides of rectangular container 10, after labeling with a polyester heat-shrinkable film, an edge bowing phenomenon 12 occurs at the edge of the label 11, thereby distorting an image printed on the label 11, giving it a poor appearance.

On the other hand, as for a film to be used as a small label, a shrinkage ratio of 30% or more in 80° C.-water is high enough. As for a film to be used to fully cover a bottle, for example, a beer bottle which must be kept at low temperatures to prevent spoilage of the beer at high temperatures, the shrinkage ratio must be higher even at low temperatures. However, conventional polyester heat-shrinkable films are insufficient for a high shrinkage ratio at low temperatures.

Japanese Laid-open Patent Publication Nos. 63-139725, 7-53416, 7-53737, 7-216107, 7-216109 and 9-254257 taught that the shrinkage rate can be adjusted by blending polyethylene terephtalate or polybutylene terephtalate in a predetermined ratio, or by copolymerizing a dicarbonic component such as a terephtalic acid and an isophtalic acid, and a diol component such as ethylene glycol and 1,4-cyclohexanedimethanol, thereby improving uniformity in shrinkage. Although the suggested methods showed an improvement in terms of uniformity in shrinkage, a shrinkage ratio in the major shrinkage direction is insufficient for use as a full covering for a container. Furthermore, because the shrinkage ratio in a direction perpendicular to the major shrinkage direction is so high, a bowing phenomenon at the edges becomes more serious when it is applied to a rectangular container, thereby deteriorating the appearance of the label with poor transparency.

To improve the edge bowing phenomenon, Japanese Laid-open Patent Publication Nos. 9-239834 and 10-77335 suggested that the shrinkage ratio be adjusted using a polyester copolymer such as neopenthylglycol[2,2-dimethyl(-1,3-propane diol, or by performing a post-drawing process accompanied with a thermal treatment. However, the shrinkage stress in a direction perpendicular to the major shrinkage direction is too high to overcome the edge bowing phenomenon by the suggested method, and the thermal shrinkage ratio in the major shrinkage direction is insufficient to be used as a full covering for a container. As illustrated in FIG. 2, another drawback is that a shrinkable film 21 cannot accurately fit to the shape of a glass bottle 20 near a cap 22, thereby resulting in poor appearance and incomplete sealing. Thus, it is very likely that external contaminants enter the glass bottle 20, causing spoilage of the content.

SUMMARY OF THE INVENTION

To solve the above problems, it is a objective of the present invention to provide a heat-shrinkable polyester film for use as labels or coverings for a variety of containers, which shows an excellent shrinkage property in addition to having superior transparency, printability, film-to-flux adhesiveness and ease of drawing process.

It is another object of the present invention to provide a method for manufacturing the heat-shrinkable polyester.

The first objective of the present invention is achieved by a heat-shrinkable polyester film comprising: a repeating unit of trimethyleneterephtalate of 5–30% by mole; a repeating unit of 2,2-dimethyl(-1,3-propylene)terephtalate of 5–30% by mole of the total composition; and a repeating unit of ethyleneterephtalate for the balance.

Preferably, to make the film opaque, the heat-shrinkable polyester film further comprises a white inorganic pigment of 5–25% by weight of the film.

The second objective of the present invention is achieved by a method for manufacturing the thermal shrinkable polyester film including a repeating unit of trimethyleneterephtalate of 5–30% by mole; a repeating unit of 2,2-dimethyl(-1,3-propylene)terephtalate of 5–30% by mole of the total composition, and a repeating unit of ethyleneterephtalate for the balance, the method comprising blending polyethyleneterephtalate, polytrimethyleneterephtalate, and 2,2-dimethyl(-1,3-propane)diol polyester copolymerized from a dicarbonic acid component and diol components to obtain a polyester series resin mixture, wherein the dicarbonic component is terephtalic acid or dimethylterephtalate, and the diol components are ethylene glycol and 2,2-dimethyl(-1,3-propane)diol. Next, the polyester series-resin mixture is extruded and molded to prepare a molten sheet. The molten sheet is cooled and solidified to prepare a solidified sheet, and then drawn.

Preferably, in the manufacture of the heat-shrinkable polyester film according to the present invention, a repeating unit of ethyleneterephtalate is comprised of 70–93% by mole of the 2,2-dimethyl(-1,3-propane)diol polyester copolymer and a repeating unit of dimethyl(-1,3-propylene) terephtalate is comprised of 7–30% by mole of the 2,2-dimethyl(-1,3-propane)diol polyester copolymer.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Figure 1:
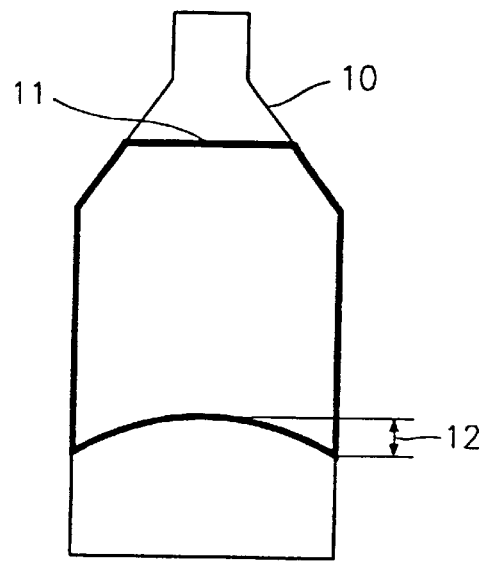
FIG. 1 shows a bowing phenomenon at an edge of a heat-shrinkable film used as a label for a rectangular container.
Figure 2:
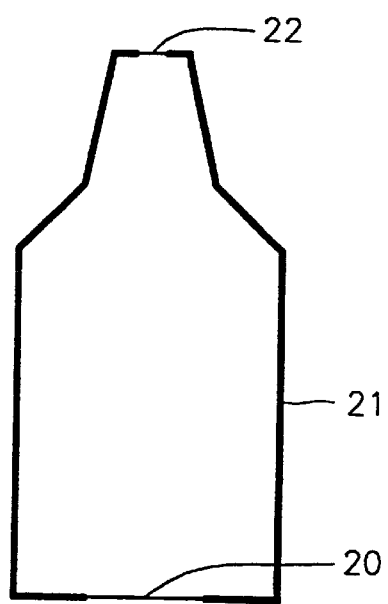
FIG. 2 is a sectional view of a glass bottle fully covered with a heat-shrinkable film.

A heat-shrinkable polyester film according to the present invention comprises a repeating unit of trimethyleneterephtalate having formula (1) below in an amount of 5 to 30%, and a repeating unit of 2,2-dimethyl(-1,3-propylene) terephtalate having formula (2) below in an amount of 5 to 30% of the total composition by mole, and ethyleneterephtalate having formula (3) for the balance.

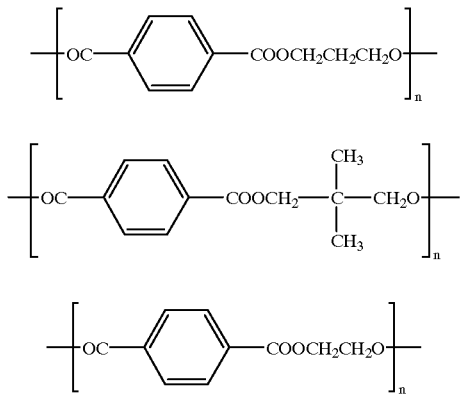

In formulae (1) through (3), n is a positive integer.

Thermal shrinkage properties of polyester films originate from their amorphous molecular chain. As for the polyester film according to the present invention, the repeating unit of 2,2-dimethyl(-1,3-propylene)terephtalate contributes to enhancing the amorphous property, thereby resulting in sufficient thermal shrinking to be used as a film. In addition, the repeating unit of 2,2-dimethyl(-1,3-propylene) terephtalate has a branched molecular structure, which improves the mechanical properties of a single-direction drawn polyester film in both the drawing direction and in a direction perpendicular to the drawing direction. As a result, film splitting which is commonly shown in a single-direction drawn polyester film can be prevented, and thus single directional drawing with a high drawing ratio can be achieved. On the other hand, the repeating unit of trimethyleneterephtalate enhances the surface adhesiveness of the film, printability, and drawing properties in the manufacture of the film.

To give more attractive properties to the polyester film, each of the repeating units of 2,2-dimethyl(-1,3-propylene) terephtalate and trimethyleneterephtalate is contained in an amount of 5 to 30% of the total composition by mole. If the content of each of the repeating units is less than 5% by mole, the previously mentioned film properties may be unsatisfactory. On the other hand, if the content of each of the repeating units exceeds 30% by mole, the content of the repeating unit of ethyleneterephtalate, which is relatively cheaper, can be reduced, thereby increasing the manufacturing cost of film. Furthermore, the mechanical properties and heat resistance of the film are deteriorated.

In the present invention, components other than the above-listed components can be further incorporated into the film to the extent that the thermal shrinkage properties are not influenced by addition of other components. For example, terephtalate components can be replaced by isophtalate components. Also, polyvalent carbonic acid as an acid component, including isophtalic acid or an ester thereof, 2,6-naphtalenedicarboxylic acid or an ester thereof, sebacic acid, adipic acid, 5-sodiumsulfurisophtalic acid, trimellitic acid, oxalic acid, malonic acid, succinic acid, glutaric acid, pimelic acid, axelaic acid, pyromellitic acid, and a polyhydric alcohol as a diol component, including diethyleneglycol, hexanediol, diol of 2,2(4-oxyphenol) propane derivatives, xylene glycol, 1,4-cyclohexane dimethanol, triethylene glycol and polytetramethylene glycol can be further added.

To provide the polyester film with opaqueness, the heat-shrinkable polyester film according to the present invention may further comprise a white inorganic pigment in an amount of 5 to 25% by weight of the film. In this case, it is preferable that the content of the repeating unit of trimethyleneterephtalate is in the range of 10 to 30% by mole, and the content of the repeating unit of 2,2-dimethyl(-1,3-propylene)terephtalate is in the range of 5 to 20% by mole. If the content of the white inorganic pigment is less than 5% by weight, the whiteness and opaqueness of the film are poor. Meanwhile, if the content of the white inorganic pigment is more than 25% by weight, the mechanical properties of the polyester film can be deteriorated, so that a successful drawing process cannot be ensured. As a result, it is difficult to produce a film with a uniform thickness. More preferably, the white inorganic pigment is at least one selected from the group consisting of titanium oxide, barium sulfide and calcium carbonate.

In the case where a white inorganic pigment is added in the manufacture of the heat-shrinkable polyester film according to the present invention, preferably, the heat-shrinkable polyester film has a whiteness of 80% or more based on ASTM E313, a transmittance of 40% or less at a thickness of 40 $\mu$m based on ASTM D1003, a surface adhesiveness of 5B grade or higher with respect to nitrocellulose series ink, a shrinkage ratio of 40% or more in the major shrinkage direction in 80° C.-water, and a shrinkage ratio of 5% or less in a direction perpendicular to the major shrinkage direction. The white and opaque polyester film has superior printability due to its excellent adhesiveness with respect to ink, and thus good appearance can be provided to the film by application of a simple printing process which uses 1 to 3 colors, without need for a complicated gravure printing process which uses 5 or more colors. Since the shrinkage ratio in the major shrinkage direction is as high as 40% or more and that in a direction perpendicular to the major shrinkage is small, the bowing phenomenon at edges of film is minimized.

According to another aspect of the present invention, a method for manufacturing the heat-shrinkable polyester film including the repeating unit of trimethyleneterephtalate in an amount of 5 to 30%, the repeating unit of 2,2-dimethyl(-1, 3-propylene)terephtalate in an amount of 5 to 30% of the total composition by mole, and ethyleneterephtalate for the balance involves: blending polyethyleneterephtalate, polytrimethyleneterephtalate, and 2,2-dimethyl(-1,3-propane)diol polyester copolymerized from a dicarbonic acid component and diol components to obtain a polyester series resin mixture, wherein the dicarbonic component is terephtalic acid or dimethylterephtalate, and the diol components are ethylene glycol and 2,2-dimethyl(-1,3-propane) diol; extruding and molding the polyester series resin mixture to prepare a molten sheet; cooling and solidifying the molten sheet to prepare a solidified sheet; and drawing the solidified sheet.

To incorporate the above amount of the repeating unit of 2,2-dimethyl(-1,3-propylene)terephtalate into the heat-shrinkable polyester film according to the present invention, it is preferable to blend 2,2-dimethyl(-1,3-propane)diol polyester copolymer having formula (4). 2,2,dimethyl(-1,3-propane)diol polyester copolymer is obtained by copolymerizing terephtalic acid or dimethylterephtalate, which is a dicarbonic acid, and ethylene glycol and 2,2-dimethyl(-1,3-propane)diol, which are diol components.

diol components including ethylene glycol, 1,3-propane diol and 2,2-dimethyl(-1,3-propane) diol hinders the full exhibition of the intrinsic properties of the repeating units of trimethyleneterephtalate and dimethyl(-1,3-propylene) terephtalate, which is not preferable. In this case, the thermal shrinkage properties of the film are unsatisfactory, the degree of copolymerization is too high, and the film is too amorphous. Thus, pre-crystallization, which is necessary to prevent melting and agglomerating during a drying process, is not able to be performed. As a result, the film must be dried at low temperatures for a long period of time. Furthermore, a melting extruder must be devised for amorphous polymers.

A variety of polyesters that constitute the heat-shrinkable polyester film can be synthesized by a well-known method, such as direct esterification or interesterification.

A composition for the heat-shrinkable polyester film according to the present invention may include a variety of additives. For example, to improve slipperiness of the film during a manufacturing process, a spherical silica, gel-type silica, alumina, caoline or calcium carbonate may be added in the preparation of the polymers previously mentioned. In addition, titanium dioxide or barium sulfate particles may be added in a predetermined amount to give a unique appearance or opaqueness to a label.

The method for manufacturing the heat-shrinkable polyester film according to the present invention involves extruding and molding a mixture of 1,3-propane diol polyester copolymer and dimethyl(-1.3-propylene)terephtalate polyester copolymer; cooling and solidifying the molded product; and single-direction or bidirection drawing the solidified product. A thermal fixation process may be further performed as needed. The heat-shrinkable polyester film manufacturing method will be described in greater detail.

(4)

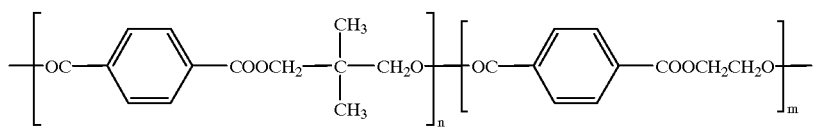

In formula (4), n and m are positive integers.

Preferably, 2,2-dimethyl(-1,3-propane)diol polyester copolymer has a limiting viscosity of 0.5 to 0.8, and includes the repeating unit of 2,2-dimethyl(-1,3-propylene) terephtalate in an amount of 5 to 30% by mole. If the content of the repeating unit is less than 7% by mole, the heat shrinkage properties of the film are unsatisfactory. If the content of the repeating unit is more than 30% by mole, increasing the degree of polymerization up to such a level may be difficult, and the high degree of copolymerization makes the film excessively amorphous. As a result, it is impossible to perform pre-crystallization which is needed so as to prevent melting and agglomerating during a drying process, and thus the drying process must be carried out at a low temperature for a long period of time. In addition, a melting extruder exclusively used for amorphous polymers must be devised.

In the manufacture of the heat-shrinkable polyester film according to the present invention, it is preferable to use polyethylene terephtalate having a limiting viscosity of 0.5 to 0.8 and polytrimethyleneterephtalate having a limiting viscosity of 0.6 to 1.0.

On the other hand, copolymerizing both of the dicarbonic acids, terephtalic acid and dimethylterephtalate, and three Firstly, 1,3-propane diol polyester copolymer and dimethyl(-1.3-propylene)terephtalate polyester copolymer are mixed well, and the mixture is melted and extruded into a molten sheet. As for the extruding and molding process using an extruder, the mixture is usually melted by heating. In certain cases, resins may be softened, rather than be melted, and then molded. The extruder may be a single-screw extruder, twin-screw and single-directional extruder, or twin-screw and bidirectional extruder. For uniform physical properties, it is preferable to use a single-screw serial random type extruder, which shows excellent mixing capability. The mixture is mixed and melted in the extruder and extruded through a die, resulting in a molten sheet. The die may be a T-die or an annular die.

The molten sheet extruded from the die is rapidly cooled to obtain a solidified sheet. Such cooling and solidification may be performed by a metal roller with a gaseous or liquid coolant. Use of metal roller improves the surface properties of the sheet with uniform thickness. Preferably, the cooling and solidification is performed in a state where the sheet is less oriented.

The solidified sheet is simultaneously or sequentially drawn with a single screw. Sequential drawing is more preferable to enhance the uniformity in thickness.

In the preferred embodiment of the present invention, the film drawn in a longitudinal direction may be further drawn in the traverse direction, i.e., perpendicular to the traveling direction of the film as needed. Any drawing method which is well known to one skilled in the art may be applicable. A traverse drawing method using a tenter, which is the most typical drawing method, is preferred. According to the traverse drawing method, two opposite sides of the film are fixed to a pair of clips, which are separated from each other by a predetermined distance, and continuously travels. The temperature of atmosphere is properly adjusted, and the distance between the two clips is widened to draw the film.

The heat-shrinkable polyester film according to the present invention has excellent drawing properties, and thus the drawing method using a tenter is applicable to the heat-shrinkable polyester film with uniform drawing properties, thereby resulting in a film with uniform thickness. Thus, when the heat-shrinkable polyester film is used as a wrapping material or a label for a variety of containers, its uniform shrinkage property gives it an attractive appearance.

Besides the drawing method using a tenter, various other methods including a gas pressure method and a milling method, or a combination of these methods are applicable.

To adjust the thermal shrinkage ratio of the film, which has passed through the drawing process, a thermal fixation process may be performed as needed. For example, the thermal fixation may be performed at 80 to 100° C. for 10 to 300 seconds while the drawn film is fully extended, relaxed, or shrunk to a certain extent. The optimum temperature for the fixation varies depending on the speed of the film passing through a thermal processing unit, i.e., depending on time period of the thermal fixation.

The present invention will be described in greater detail by means of the following examples. The following examples are for illustrative purposes and not intended to limit the scope of the invention.

Synthesis Example 1

Polyethyleneterephtalate (A1) having a limiting viscosity of 0.62 was synthesized by a common method.

100 parts by mole of dimethylterephtalate and 140 parts by mole of 1,3-propane diol were put into an autoclave equipped with a mixer and a distillation column, and tetrabutylenetitanate as a catalyst for interesterification was added in an amount of 0.05% by weight of dimethylterephtalate. After removing methanol, which was a byproduct, the temperature was raised up to 220° C. for further reaction. After the interesterification was completed, trimethylphosphate as a stabilizer was added in an amount of 0.045% by weight of dimethylterephtalalte, and antimonytrioxide as a polymerization catalyst was further added 10 minutes later in an amount of 0.02% by weight. After 5 minutes, the resulting product was transferred into a second reactor equipped with a vacuum unit, and reacted at 280° C. for about 180 minutes for polymerization, so that a polymer (B1) of trimethyleneterephtalate having a limiting viscosity of 0.85 was obtained.

100 parts by mole of dimethylterephtalate, 110 parts by mole of ethyleneglycol and 40 parts by mole of neopentylglocol (2,2-dimethyl(-1,3-propane)diol) were put into an autoclave equipped with a mixer and a distillation column, and manganese acetate as a catalyst for interesterification was added in an amount of 0.07% by weight of dimethylterephtalate. After removing methanol, which was a byproduct, the temperature was raised up to 220° C. for further reaction. After the interesterification was completed, trimethylphosphate as a stabilizer was added in an amount of 0.04% by weight of dimethylterephtalalte. After 5 minutes, antimonytrioxide in an amount of 0.035% by weight, as a catalyst for polymerization, and 0.005% by weight of the tetrabutylenetitanate were added, and stirred for 10 minutes. Next, the resulting product was transferred into a second reactor equipped with a vacuum unit, and the pressure was slowly reduced while the temperature was raised up to 285° C. The temperature was maintained for about 210 minutes for polymerization, thereby resulting in a neopentylglocol polyester copolymer (C1) having a limiting viscosity of 0.60.

EXAMPLES 1 THROUGH 6 and

Comparative Examples 1 Through 6

To avoid melting during a drying process, polyethyleneterephtalate (A1), trimethyleneterephtalate (B1) and neopenthylglycol polyester copolymer (C1), which, which were prepared in Synthesis Example 1, were pre-crystalized, and then mixed in various ratios listed in Table 1. Each of the mixtures was dried in a rotary vacuum drier until the moisture content reached 0.005% or less by weight. The content of the repeating units of ethyleneterephtalate (A'), trimethyleneterephtalate (B') and dimethyl(-1,3-propylene) terephtalate (C') for the dried polyester mixtures for each sample was analyzed. The results are shown in Table 2.

Each of the polyester mixtures was melted at 280° C., extruded, and cooled by a casting roller whose temperature was maintained at 20° C., thereby resulting in an amorphous sheet. The amorphous sheet was sequentially drawn to 3.6 times its original length by a tenter at 80° C., so that a single-direction drawn heat-shrinkable polyester film having a thickness of 50 μm was obtained.

TABLE 1

| | Composition of Film | | | | |
| --- | --- | --- | --- | --- | --- |
| | | | Copolymer C1 | | |
| | Polymer A1 (% by weight) | Polymer B2 (% by weight) | Copolymerization ratio (% by mole) | | (% by weight) |
| Example | | | EG* | NPG | |
| Example 1 | 0 | 50 | 42 | 58 | −50 |
| Example 2 | 10 | 50 | 42 | 58 | 40 |
| Example 3 | 15 | 35 | 49 | 51 | 50 |
| Example 4 | 0 | 25 | 82 | 18 | 75 |
| Example 5 | 30 | 15 | 82 | 18 | 55 |
| Example 6 | 75 | 10 | 82 | 18 | 25 |
| Comparative Example 1 | 85 | 3 | 82 | 18 | 12 |
| Comparative Example 2 | 0 | 0 | 81 | 19 | 100 |
| Comparative Example 3 | 75 | 25 | 0 | 0 | 0 |
| Comparative Example 4 | 65 | 35 | 82 | 18 | 10 |
| Comparative Example 5 | 58 | 7 | 82 | 18 | 35 |

*EG and NPG are abbreviations for ethyleneglycol and neopenthylglycol, respectively.

TABLE 2

| Example | Content of Repeating Units (% by mole) | | |
|---|---|---|---|
| | A' | B' | C' |
| Example 1 | 51 | 25 | 24 |
| Example 2 | 61 | 25 | 14 |
| Example 3 | 66 | 20 | 14 |
| Example 4 | 75 | 14 | 11 |
| Example 5 | 82 | 10 | 8 |
| Example 6 | 88 | 5 | 7 |
| Comparative Example 1 | 95 | 3 | 2 |
| Comparative Example 2 | 81 | 0 | 19 |
| Comparative Example 3 | 79 | 21 | 0 |
| Comparative Example 4 | 72 | 25 | 3 |
| Comparative Example 5 | 83 | 2 | 15 |

Synthesis Example 2

100 parts by mole of dimethylterephtalate and 180 parts by mole of ethyleneglycol were put into an autoclave equipped with a distillation column, and manganese acetate as a catalyst for interesterification at 150° C. was added in an amount of 0.05% by weight of dimethylterephtalate. After removing methanol, which was a byproduct, the temperature was raised up to 220° C. for further reaction. After the interesterification was completed, trimethylphosphate as a stabilizer was added in an amount of 0.045% by weight of dimethylterephtalalte. After 10 minutes, antimonytrioxide of 0.03% by weight, as a catalyst for polymerization, was added. After 5 minutes, the resulting product was transferred into a second reactor equipped with a vacuum unit, and maintained at 280° C. for about 140 minutes for polymerization, so that a polymer (A2) of polyethyleneterephtalate having a limiting viscosity of 0.62 was obtained.

Polymerization was carried out in the same way as for the polymer (A2) of polyethyleneterephtalate, except that trimethyleneglycol as a diol component was used instead of ethyleneglycol, so that a polymer (B2) of polytrimethyleneterephtalate having a limiting viscosity of 0.85 was obtained.

Polymerization was carried out in the same way as for the polymer (A2) of polyethyleneterephtalate, except that 180 parts by mole of ethyleneglycol added as a diol component was replaced by 90 parts by mole of ethyleneglycol and 90 parts by mole of 2,2-dimethyl(-1,3-propane)diol, so that 2,2-dimethyl(-1,3-propane)diol polyester copolymer (C2), which had a limiting viscosity of 0.64, was obtained.

The obtained polymer (A2) of polyethyleneterephtalate and titanium oxide (having an average particle size of 0.5 μm) having the same crystalline structure as that of anatase were mixed in a ratio of 1:1 by weight to manufacture a titanium oxide master chip (D2).

EXAMPLES 7 THROUGH 19 and

Comparative Examples 6 and 7

The polymer (A2) of polyethyleneterephtalate, the polymer (B2) of polytrimethyleneterephtalate, the polyester copolymer (C2) including 2,2-dimethyl(-1,3-propane)diol, and the titanium oxide master chip (D2), which were prepared in Synthesis Example 2, were separately dried until the moisture content reached 0.05% or less by weight. The dried polymers were mixed in various ratios shown in Table 3. The content of the repeating units of ethyleneterephtalate (A"), trimethyleneterephtalate (B") and dimethyl(-1,3-propylene)terephtalate (C") for the dried polyester mixtures for each sample was analyzed. The results are shown in Table 4.

Each of the polyester mixtures was melted at 280° C., extruded, and cooled by a casting roller whose temperature was maintained at 30° C., thereby resulting in an amorphous sheet. The amorphous sheet was sequentially drawn to 3.5 times its original length by a tenter, so that a single-direction drawn heat-shrinkable polyester film having a thickness of 40 μm was obtained.

TABLE 3

| | Composition of Film | | | | | |
|---|---|---|---|---|---|---|
| | | | C2 | | | |
| | | | Copolymerization | | | |
| | A2 (% by | B2 (% by | ratio (% by mole) | | (% by | D2 (% by |
| Example | weight | weight | EG* | DMPG | weight) | weight) |
| Example 7 | 34 | 20 | 50 | 50 | 32 | 28 |
| Example 8 | 39 | 15 | 50 | 50 | 32 | 28 |
| Example 9 | 29 | 25 | 50 | 50 | 32 | 28 |
| Example 10 | 30 | 20 | 50 | 50 | 36 | 28 |
| Example 11 | 42 | 20 | 50 | 50 | 24 | 28 |
| Example 12 | 25 | 25 | 50 | 50 | 36 | 28 |
| Example 13 | 47 | 15 | 50 | 50 | 24 | 28 |
| Example 14 | 40 | 20 | 50 | 50 | 32 | 16 |
| Example 15 | 26 | 20 | 50 | 50 | 32 | 44 |
| Example 16 | 49 | 5 | 50 | 50 | 32 | 28 |
| Comparative Example 6 | 14 | 40 | 50 | 50 | 32 | 28 |
| Comparative Example 7 | 60 | 20 | 50 | 50 | 6 | 28 |
| Example 17 | 16 | 20 | 50 | 50 | 50 | 28 |
| Example 18 | 46 | 20 | 50 | 50 | 32 | 4 |
| Example 19 | 8 | 20 | 50 | 50 | 32 | 80 |

*EG and DMPG are abbreviations for ethyleneglycol and 2,2-dimethyl(-1,3-propane)diol, respectively.

TABLE 4

| | Content of Repeating Units (% by mole) | | | $TiO_2$ (% by |
|---|---|---|---|---|
| Example | A" | B" | C" | weight)* |
| Example 7 | 64 | 20 | 16 | 12.3 |
| Example 8 | 69 | 15 | 16 | 12.3 |
| Example 9 | 59 | 25 | 16 | 12.3 |
| Example 10 | 62 | 20 | 18 | 12.3 |
| Example 11 | 68 | 20 | 12 | 12.3 |
| Example 12 | 57 | 25 | 18 | 12.3 |
| Example 13 | 73 | 15 | 12 | 12.3 |
| Example 14 | 64 | 20 | 16 | 7.4 |
| Example 15 | 64 | 20 | 16 | 18 |
| Example 16 | 79 | 5 | 16 | 12.3 |
| Comparative Example 6 | 44 | 40 | 16 | 12.3 |
| Comparative Example 7 | 77 | 20 | 3 | 12.3 |
| Example 17 | 55 | 20 | 25 | 12.3 |
| Example 18 | 64 | 20 | 16 | 2 |
| Example 19 | 64 | 20 | 16 | 28.6 |

*The content of $TiO_2$ is based on the weight of film.

The performances of the polyester films manufactured in the examples and the comparative examples were measured in terms of the following properties. The results are shown in Tables 5 and 6.

(1) Thermal shrinkage ratio

A polyester film was cut into pieces of 15 mm (width) by 200 mm (length). The cut polyester film was put in water whose temperature was kept at 80° C. The length of the piece was measured before and after the thermal treatment, and the thermal shrinkage ratio was evaluated by the following formula Thermal shrinkage ratio (%)=$[(L-l)/L] \times 100$ where L is the length of film before thermal treatment, and l is the length of film after thermal treatment.

(2) Printability

Nitrocellulose series ink was spread over the surface of the film and patterned regularly with a predetermined interval using a razor blade. A semitransparent tape having an adhesive strength of 40 g/mm was adhered to the ink-coated surface of the film with the application of pressure. The printability was evaluated by the amount of ink transferred onto the tape when the tape adhered to the ink-coated surface was separated from the surface, according to the following criteria.

○: No ink was transferred onto the tape.

Δ: 70% or less of the ink was transferred onto the tape.

x: 70% or more of the ink was transferred onto the tape.

(3) Adhesive property with respect to flux

The adhesiveness of the films with respect to tetrahydrofuran (THF), which is a common flux, was evaluated according to the following criteria.

○: A film-and-flux contact portion was transparent and instantaneous adhesiveness was excellent.

x The adhesiveness of the film was almost zero and instantaneous adhesiveness was poor (4) Coating property over glass bottle Grids each having a size of 10 mm by 10 mm were patterned over the manufactured heat-shrinkable films, and then rolled and adhered with THF into a cylindrical shape having a diameter of 65 mm. Then, a commercially available glass bottle (having a capacity of 334 ml) was covered with the cylindrical heat-shrinkable film in water whose temperature was kept at 85° C. or 90° C. Next, the coating property was evaluated according to the following criteria.

○: Grids were uniform over the glass bottle and the accuracy with which the film fitted to the shape of the lid of the bottle was good after covering at 90° C.

Δ: Grids are uniform over the glass bottle and the accuracy with which the film fitted to the shape of the lid of the bottle was good after covering at 85° C.

x Grids are nonuniform over the glass bottle and the accuracy with which the film fitted to the shape of the lid of the bottle was poor after covering at 85° C.

(5) Bowing phenomenon

A rectangular PET bottle having a side width of 8 cm was covered with the manufactured hear shrinkable film having a width 10 cm in 80° C.-water for 10 seconds. Next, the degree to which the edge of the film bowed inward was measured.

(6) Extendablility

The appearance and the uniformity in thickness of the film after having been drawn were observed, and evaluated according to the following criteria.

○: Film had good uniformity in thickness without being whitened.

x: Either film became whitened or had nonuniformity in thickness.

◇: Evaluation of the extendability of film was impossible due to so irregular extensibility of film.

(7) Rupture strength

The rupture strength of the manufactured films was measured using a tensile strength tester (Model 6021, manufactured by Instron Co.). For measuring the rupture strength, the films were cut into pieces (10 cm-length by 15 mm-width), and the rupture strength was measured at room temperature.

(8) Haze

The haze of the manufactured films was measured using a haze tester (Model xl-211, manufactured by Gardner Neotech.)

(9) Whiteness

The whiteness of the manufactured films was measured according to ASTM E313-96.

(10) Light Transmittance

The light transmittance of the manufactured film was measured according to ASTM D1003 (with a 25 mm-diameter at 2.5°-angle of scattering).

(11) Adhesiveness with respect to nitrocellulose ink

The adhesiveness of the films with respect to nitrocellulose ink was measured according to ASTM D3359-83.

(12) Spontaneous Shrinkage Ratio

The manufactured films were cut into pieces having a width of 15 mm and a length of 200 mm, and left for 7 days in an oven whose temperature was set at 40° C. The length of the film was measured before and after putting the film into the oven, and the spontaneous shrinkage ratio was calculated by the same formula used to calculate the thermal shrinkage ratio.

(13) Appearance

The appearance of the manufactured films was visually inspected according to the following criteria, after having been shrunk by 30% in 80° C.-water in the traverse direction with respect to the major shrinkage direction.

◎: excellent appearance (no wrinkles and no cloudiness)

x: poor appearance (with both winkles and cloudiness)

TABLE 5

| Example | Shrinkage Ratio in 80° C. water (%) | | Extendability of film | Tensile strength in major shrinkage direction (kg/mm²) | Haze (%) | Bowing phenomenon | Coating property | Printability | Adhesiveness with respect to flux |
|---|---|---|---|---|---|---|---|---|---|
| | MD* | TD | | | | | | | |
| Example 1 | 61 | −1.9 | ○ | 6.8 | 3.9 | 0 | Δ | Δ | ○ |
| Example 2 | 69 | −1.0 | ○ | 5.7 | 3.9 | 0 | ○ | ○ | ○ |
| Example 3 | 72 | 0 | ○ | 5.5 | 4.2 | 0 | ○ | ○ | ○ |
| Example 4 | 71 | 0 | ○ | 5.2 | 4.7 | 0.4 | ○ | ○ | ○ |
| Example 5 | 72 | 0.8 | ○ | 5.4 | 5.2 | 0.9 | ○ | ○ | ○ |

TABLE 5-continued

| Example | Shrinkage Ratio in 80° C. water (%) MD* | Shrinkage Ratio in 80° C. water (%) TD | Extenda-bility of film | Tensile strength in major shrink-age direction (kg/mm²) | Haze (%) | Bowing phenom-enon | Coating property | Printabil-ity | Adhesiv-eness with respect to flux |
|---|---|---|---|---|---|---|---|---|---|
| Example 6 | 65 | 1.1 | ○ | 4.9 | 5.3 | 1.2 | × | ○ | ○ |
| Comparative Example 1 | 61 | 3.9 | × | 6.2 | 7.8 | 3.1 | × | Δ | × |
| Comparative Example 2 | — | — | * | — | — | — | — | — | — |
| Comparative Example 3 | 41 | 9.4 | ○ | immea-surable | 5.1 | 6.7 | × | Δ | × |
| Comparative Example 4 | 64 | 3.7 | × | immea-surable | 4.9 | — | Δ | Δ | × |
| Comparative Example 5 | 55 | 4.3 | × | 5.3 | 10.2 | 3.5 | × | × | × |

*MD and TD indicate the shrinkage ratios in the major shrinkage direction and in the traverse direction with respect to the major shrinkage direction, respectively, of the films.

As shown in FIG. 5, the heat-shrinkable polyester films manufactured in Examples 1 through 6 according to the present invention are superior in terms of extendability, tensile strength, film-and-flux adhesiveness, transparency, printability and thermal shrinkage ratio in the major shrinkage direction, and the bowing phenomenon at edge of the film was almost non-existent. Thus, the heat-shrinkable films having such excellent properties can be used as labels or coverings for a variety of containers.

As for the heat-shrinkable polyester films according to the present invention, it is concluded that if the content of the repeating unit of trimethylene terephtalate is less than 5 mole % (Comparative Examples 1, 2 and 5), the shrinkage ratio in the traverse direction with respect to the major shrinkage direction increases, so that the bowing phenomenon is shown at the edge of the film. Furthermore, the film-and-flux adhesiveness and the transparency of the film are degraded. On the other hand, if the content of the repeating unit of dimethyl(-1,2-propylene)terephtalate is less than 5 mole %, the tensile strength of the film in the major shrinkage direction sharply decreases.

TABLE 6

Properties of Polyester Films

| Example | Whiteness (%) | Light Transmitance (%) | Adhesivness with respect to NC ink** (grade) | Rupture Strength (kgf/mm²) MD* | Rupture Strength (kgf/mm²) TD | Spontaneous shrinkage ratio TD | Thermal Shrinkage Ratio (%) MD | Thermal Shrinkage Ratio (%) TD | Appear-ance |
|---|---|---|---|---|---|---|---|---|---|
| Example 7 | 105 | 21 | 5B | 6.9 | 22.1 | 0.2 | 3 | 62 | ◉ |
| Example 8 | 105 | 21 | 5B | 6.9 | 22.5 | 0.2 | 3 | 55 | ◉ |
| Example 9 | 105 | 21 | 5B | 6.9 | 21.2 | 0.2 | 3 | 66 | ◉ |
| Example 10 | 105 | 21 | 5B | 7.4 | 21.9 | 0.3 | 3 | 70 | ◉ |
| Example 11 | 105 | 21 | 5B | 5.9 | 22.4 | 0.2 | 4 | 54 | ◉ |
| Example 12 | 105 | 21 | 5B | 7.3 | 20.7 | 0.4 | 4 | 71 | ◉ |
| Example 13 | 105 | 21 | 5B | 6.1 | 22.8 | 0.2 | 4 | 50 | ◉ |
| Example 14 | 95 | 30 | 5B | 7.1 | 22.3 | 0.2 | 3 | 64 | ◉ |
| Example 15 | 112 | 15 | 5B | 6.2 | 20.5 | 0.2 | 3 | 58 | ◉ |
| Example 16 | 105 | 21 | 5B | 6.9 | 22.2 | 0.2 | 3 | 57 | × |
| Comparative Example 6 | 105 | 21 | 5B | 6.9 | 16.5 | 0.5 | 4 | 60 | ◉ |
| Comparative Example 7 | 105 | 21 | 5B | 3.5 | 22.3 | 0.2 | 7 | 32 | ◉ |
| Example 17 | 105 | 21 | 5B | 7.8 | 14.7 | 0.4 | 4 | 68 | ◉ |
| Example 18 | 60 | 72 | 5B | 6.9 | 22.2 | 0.2 | 3 | 62 | ◉ |
| Example 19 | 115 | 11 | 5B | 3.2 | 13 | 1.5 | 7 | 30 | × |

*MD and TD indicate the shrinkage ratios in the major shrinkage direction (lateral direction) and in the traverse direction (longitudinal direction) with respect to the major shrinkage direction, respectively, of the films.
**NC ink indicates nitrocellulose series ink.

Referring to Table 6, as for the heat-shrinkable polyester films of Examples 7 through 15, which contain white pigment, all properties including whiteness, light transmission, adhesiveness with respect to ink, mechanical properties, shrinkage properties and appearance are excellent. In addition, if the content of titanium oxide is less than 5% by weight of the film (Example 18), the heat shrinkage property is good, but the whiteness and opaqueness of the film is less satisfactory than desired. Meanwhile, if the content of titanium oxide is more than 25% by weight, the thermal shrinkage property deteriorates thus giving a poor appearance.

When the content of the repeating unit of trimethylene terephtalate exceeds 30 mole %, the rupture strength of film decreases (Comparative Example 6). When the content of the repeating unit of dimethyl(-1,3-propylene)terephtalate is less than 5 mole % (Comparative Example 7), the thermal shrinkage properties of the film sharply deteriorate.

As previously described, the heat-shrinkable polyester films according to the present invention satisfy the need for excellent basic properties including transparency, printability, film-and-flux adhesiveness and ease of drawing process, and thus they can be applicable as labels or coverings for a variety of containers. In particular, when the heat-shrinkable polyester films according to the present invention are used as a label for a rectangular container, the bowing of the film at the edge in the traverse direction with respect to a major shrinkage direction can be minimized. Furthermore, addition of inorganic pigments and metal sulfonate derivative can give whiteness, opaqueness and static-eliminating properties to the heat-shrinkable polyester films according to the present invention.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A heat-shrinkable polyester film comprising:
   a repeating unit of trimethyleneterephtalate of 5–30% by mole;
   a repeating unit of 2,2-dimethyl(-1,3-propylene) terephtalate of 5–30% by mole of the total composition; and
   a repeating unit of ethyleneterephtalate for the balance.

2. The heat-shrinkable polyester film of claim 1, further comprising a white inorganic pigment of 5–25% by weight of the film.

3. The heat-shrinkable polyester film of claim 3, wherein the white inorganic pigment is at least one selected from the group consisting of titanium oxide, barium sulfide and calcium carbonate.

4. The heat-shrinkable polyester film of claim 2, wherein the content of the repeating unit of trimethylleneterephtalate is in the range of 10–30% by mole, and the content of the repeating unit of 2,2-dimethyl(-1,3-propylene)terephtalate is in the range of 5–20% by mole.

5. The heat-shrinkable polyester film of claim 2, wherein the polyester film has a whiteness of 80% or more based on ASTM E313, a light transmittance of 40% or less at a thickness of 40 μm based on ASTM D1003, a surface adhesiveness of 5B grade or more with respect to nitrocellulose series ink based on ASTM D3359, a shrinkage ratio of 40% or more in the major shrinkage direction in 80° C.-water, and a shrinkage ratio of 5% or less in the traverse direction with respect to the major shrinkage direction.

6. A method for manufacturing the thermal shrinkable polyester film of claim 1, comprising:
   blending polyethyleneterephtalate, polytrimethyleneterephtalate, and 2,2-dimethyl(-1,3-propane)diol polyester copolymerized from a dicarbonic acid component and diol components to obtain a polyester series resin mixture, wherein the dicarbonic component is terephtalic acid or dimethylterephtalate, and the diol components are ethylene glycol and 2,2-dimethyl(-1,3-propane)diol;
   extruding and molding the polyester series resin mixture to prepare a molten sheet;
   cooling and solidifying the molten sheet to prepare a solidified sheet; and
   drawing the solidified sheet.

7. The method of claim 6, wherein the polytrimethyleneterephtalate has a limiting viscosity of 0.6–1.0.

8. The method of claim 6, wherein the 2,2-dimethyl(-1, 3-propane)diol polyester copolymer has a limiting viscosity of 0.5 to 0.8.

9. The method of claim 6, wherein a repeating unit of ethyleneterephtalate is comprised of 70–93% by mole of the 2,2-dimethyl(-1,3-propane)diol polyester copolymer and a repeating unit of dimethyl(-1,3-propylene)terephtalate is comprised of 7–30% by mole of the 2,2-dimethyl(-1,3-propane)diol polyester copolymer.

* * * * *